Figure 1:
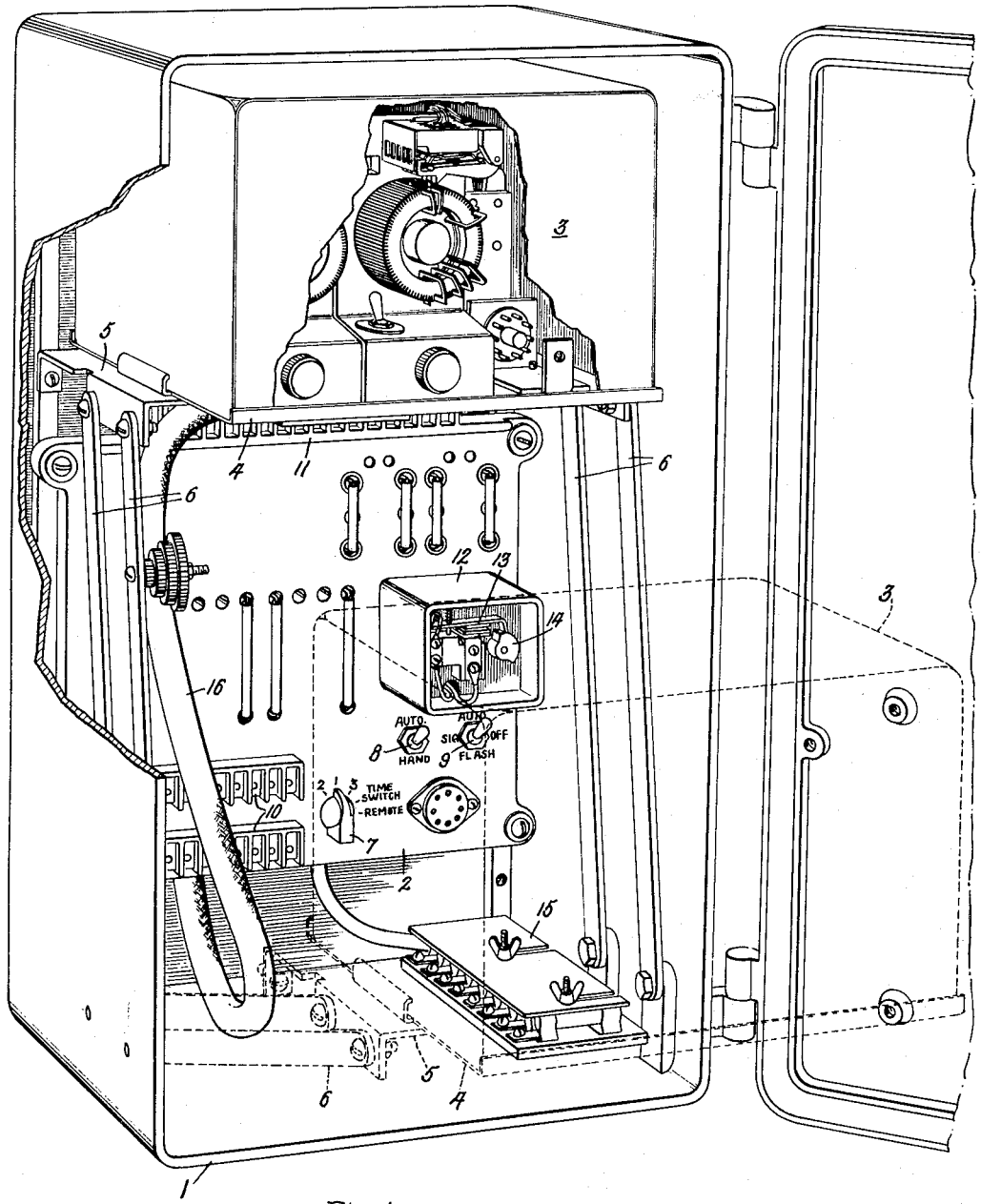

Nov. 29, 1955   R. A. REID ET AL   2,725,433
CYCLIC PROGRAM TIMER
Original Filed March 17, 1951

4 Sheets-Sheet 1

Inventors:
Ralph A. Reid;
Vincent W. Leonard,
by   Claude A. Moir.
Their Attorney.

Nov. 29, 1955    R. A. REID ET AL    2,725,433
CYCLIC PROGRAM TIMER
Original Filed March 17, 1951    4 Sheets-Sheet 2
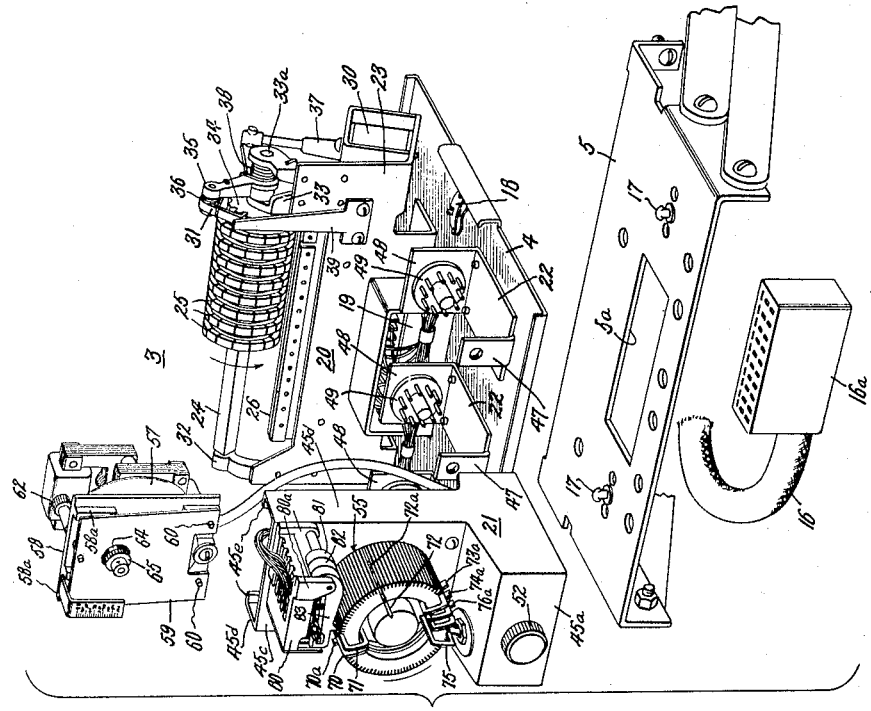
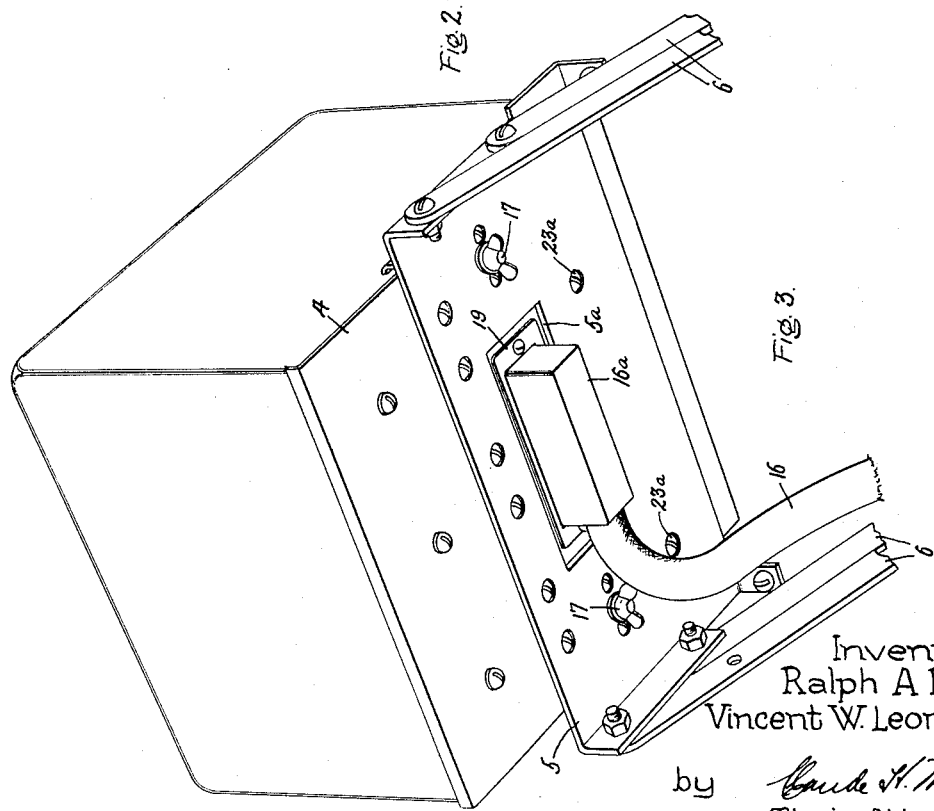
Inventors:
Ralph A Reid;
Vincent W. Leonard
by
Their Attorney.

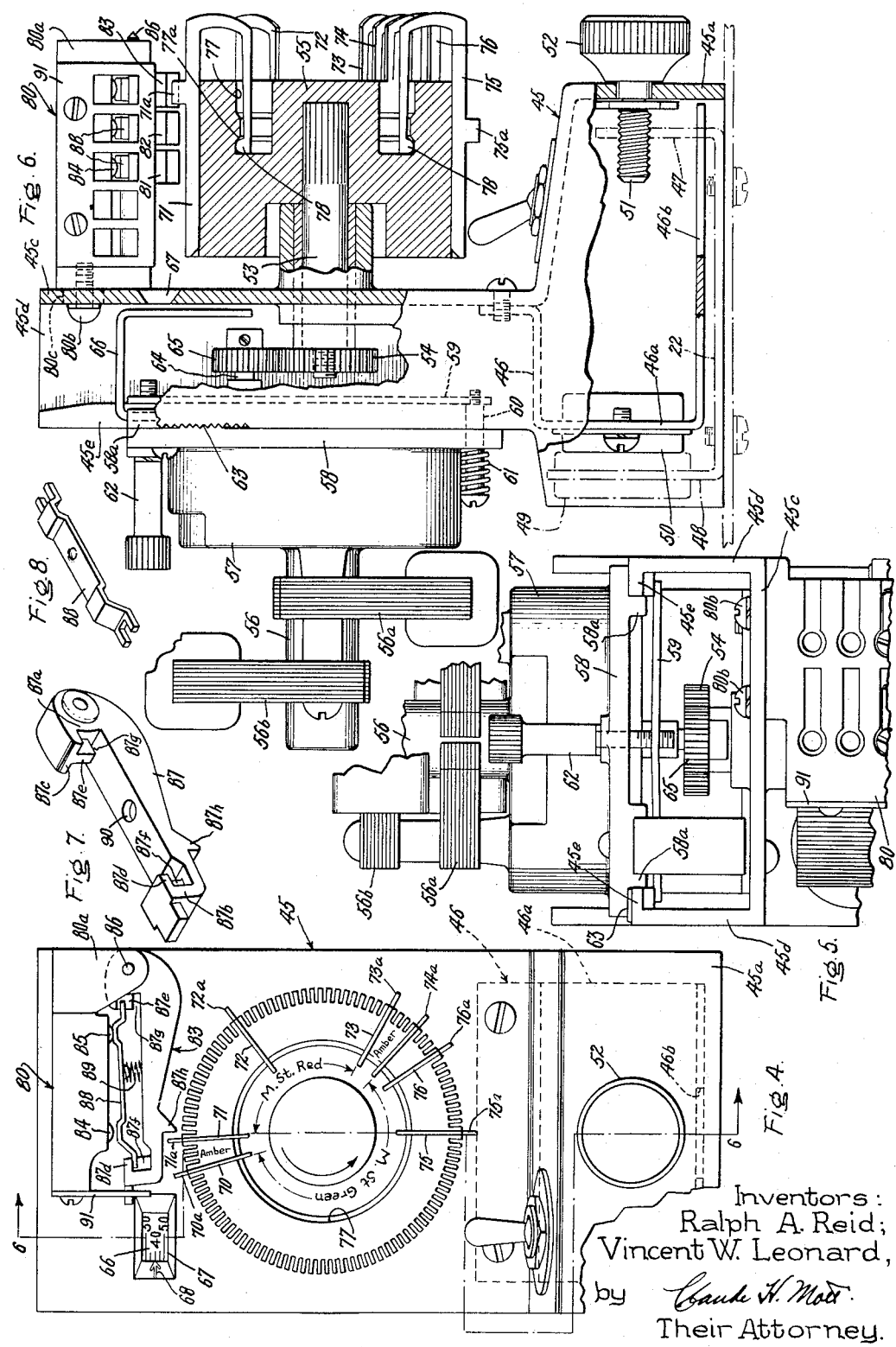

Nov. 29, 1955   R. A. REID ET AL   2,725,433
CYCLIC PROGRAM TIMER
Original Filed March 17, 1951   4 Sheets-Sheet 4
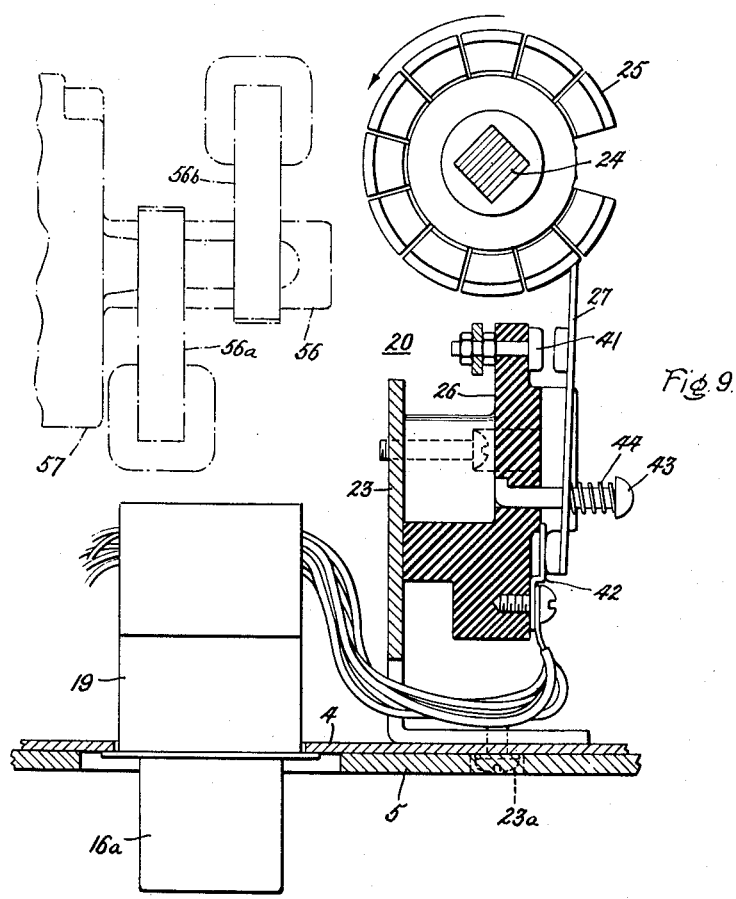
Inventors:
Ralph A. Reid;
Vincent W. Leonard,
by *Claude H. Mitt*
Their Attorney.

United States Patent Office 2,725,433
Patented Nov. 29, 1955

2,725,433

CYCLIC PROGRAM TIMER

Ralph Alden Reid, Beverly, and Vincent W. Leonard, Saugus, Mass., assignors to General Electric Company, a corporation of New York Original application March 17, 1951, Serial No. 216,124. Divided and this application March 28, 1952, Serial No. 279,144

6 Claims. (Cl. 200—38)

Our invention relates to cyclic program timers and more particularly to program timers for traffic signal controllers of the pretimed type. This application is a division of our copending application Ser. No. 216,124, filed March 17, 1951, for "Traffic Signal Controller" and assigned to the same assignee as the instant application.

Traffic signal controllers commonly include a rotatable signal sequence controller of the cam drum type having electro-responsive actuating means, and a continuously operable cyclic program timer for recurrently energizing the electro-responsive controller in accordance with a predetermined signal display program. The program timer comprises one or more timing contacts recurrently actuated by adjustable keys carried in a continuously rotating timing dial or drum. A traffic signal controller of this general type is disclosed and claimed in Patents 2,236,297, 2,236,298 and 2,236,299 issued to Ralph A. Reid on March 25, 1941.

Where the terms "timing dial" or "timing drum" are used hereinafter they designate the rotating dial or drum of a cyclic program timer such as referred to above, the term "timing dial" being used as generic to avoid confusion between a program timer drum and a signal sequence controller drum. Where the term "drum controller" is used hereinafter it refers to the signal sequence controller including a cam drum and its intermittently energized actuating means. The terms "signal timer" or "signal cycle timer" refer to the signal sequence controller and its controlling program timer or timers. Finally, the term "signal controller" is used to designate the complete apparatus for controlling a group of signals at an intersection, including the signal timer, a switchboard, necessary manual switches and relays, and a cabinet in which the whole is mounted.

It is a general object of our invention to provide a self-contained program timing unit which is readily assembled and disassembled, is simply and readily adjusted over a wide range of selectable cyclic programs, and is simple, reliable, accurate and durable in operation.

It is a further object of our invention to provide a program timer of the rotating dial type in which improved means are provided for adjustably but accurately and firmly mounting in the dial one or more contact actuating keys or the like.

It is still another object of our invention to provide new and novel means for adjustably mounting a program timer driving motor to permit simple and rapid change of driving gears, thereby to vary the cycle time, and for simultaneously indicating the cycle time for which the timer is set.

Our invention itself will be more fully understood and its various objects and advantages further appreciated by referring now to the following detailed specification taken in conjunction with the accompanying drawings in which Fig. 1 is a front view of our improved traffic signal controller showing the enclosure door open and the enclosure itself partially broken away; Fig. 2 is an exploded perspective view of the signal timer removed from its enclosing casing; Fig. 3 is a bottom view of the signal timer shown mounted upon its supporting shelf; Fig. 4 is a front elevational view of a single program cycle timer, or dial unit embodying our invention; Fig. 5 is a fragmentary top view of the program cycle timer; Fig. 6 is a cross-sectional view taken along the lines 6—6 of Fig. 4; Figs. 7 and 8 are perspective views of various parts of a disassembled program timer contact member; and Fig. 9 is a transverse cross-sectional view of the signal sequence drum controller unit.

In carrying out the invention of our foregoing copending application in one form, we provide a signal timer removably mounted as a unit within a controller cabinet. The timer itself comprises a number of separable units all removably mounted upon a single timer base. On this base is mounted an integral drum controller unit and one or more signal program timers, or dial units. The program timer units themselves are a preferred embodiment of the invention of the present application. These units are readily demountable and simply and easily adjustable to various desired program settings. The timing dial is cylindrical and axially slotted about its periphery to provide for firm and accurate positioning of one or more adjustable contact actuating keys, and means are provided for readily snapping the keys into and out of position. In addition, the timer driving motor is adjustably mounted upon a serrated trackway to provide for quick and simple change of timing gears to control the cycle time.

Referring now to the drawings in detail, Fig. 1 is a front elevational view of a signal controller including several program timers embodying our present invention. The controller includes an enclosing casing 1 having mounted therein a switchboard 2 and a signal timer 3. The signal timer 3 is mounted upon a removable base plate 4 carried on a swingable shelf 5. The shelf 5 is mounted upon two pairs of pantograph links 6, and may be moved forwardly and downwardly out of the front opening of the casing by swinging movement of the pantograph links to a position shown in dotted lines at Fig. 1. The switchboard 2 is provided with selector switches 7, 8 and 9 forming part of a control circuit not shown. Also mounted upon the switchboard 2 are banks of terminal connectors 10 and 11 and a periodic flasher unit 12. The flasher unit 12 includes a flash switch 13 and an actuating cam 14 driven by an electric motor which has not been shown in the drawings. The cam 14 is arranged periodically to actuate the switch 13 when the flasher motor is energized. A bank of fuses 15 is mounted in the lower part of the casing and a flexible connector 16 is connected between the switchboard 2 and the signal timer 3.

At Fig. 2 I have shown the signal timer 3 in partially exploded perspective view and removed from the supporting shelf 5. As best shown at Fig. 1, the signal timer comprises a number of self-contained timer elements all mounted upon the base plate 4. For simplicity, only one such timer has been shown at Fig. 2. The base plate 4 is adapted to be positioned upon the swingable shelf 5 and removably connected thereto by a pair of quarter turn fasteners 17 which are cooperable with a pair of resilient couplings 18 on the base plate 4. Mounted substantially centrally upon the timer plate 4 is an electrical plug connector 19 having a plurality of prongs extending downwardly through a central aperture in the plate 4. A corresponding aperture 5a is provided in the swingable shelf 5 through which the connector prongs extend into cooperative relation with a multiple receptacle 16a at the end of a cable 16.

The signal timer itself comprises a signal sequence or drum, controller unit 20 mounted upon the rear of the timer base behind the plug connector 19, and one or more program timing, or dial, units 21 mounted upon the forward side of the base plate 4 upon separate mounting brackets 22. While only a single program timer 21 is shown at Fig. 2 and two such timers are shown at Fig. 1, it will be understood by those skilled in the art that either one, two or three program timing units 21 may be mounted upon the timer base 4, each upon a separate U-shaped mounting bracket 22.

The signal sequence controller 20 is a self-contained unit including a supporting frame or bracket 23 fixed to the base plate 4 by bolts 23a and having mounted thereon a controller drum comprising a rotatable shaft 24 carrying a plurality of cams 25, a switch block 26 carrying a plurality of signal switches 27 (Fig. 9), an actuating solenoid 30, and a connecting linkage between the solenoid and the drum shaft 24 including a pawl 31.

The controller shaft 24 is of rectangular cross section and is rotatably mounted between a pair of brackets 32 and 33 fixed at opposite ends of the supporting bracket 23. The shaft 24 is provided at one end with an axial pin (not shown) journalled in the bracket 32. At its other end the shaft 24 is axially recessed and provided with an internal bearing which is journalled upon a pin 33a mounted in and extending beyond the bracket 33. The shaft 24 has slidably mounted on its rectangular portion a plurality of separate frangible cams 25 of the type described in Patent 2,236,397 issued to R. A. Reid, and carries at one end a ratchet wheel 34. The shaft 24 and cams 25 together constitute a cam drum.

The shaft journal bracket 33 is formed with two axially spaced apart arms between which is journalled upon the pin 33a a bell crank lever 35. The pawl 31 is pivotally mounted at one end of one of the bell crank arms and biased by means of a spring 36 into engagement with the ratchet wheel 34. To the other arm of the bell crank lever 35 is pivotally connected a plunger 37 for the solenoid 30. A coil spring 38 is positioned upon a hub of the bell crank 35 adjacent the bell crank lever 35. The coil spring 38 is connected at its ends to one arm of the journal bracket 33 and one arm of the bell crank lever 35 to bias the bell crank in a direction to rotate the drum shaft 24. A leaf spring 39 fixed to the mounting bracket 23 is positioned to serve as a resilient stop for the pawl 31. The pawl 31 is so disposed with respect to the ratchet wheel 34 that when the pawl is in engagement with the leaf spring 39, as shown at Fig. 2, the leaf spring 39 serves also to hold the pawl in position in a notch of the ratchet wheel. A second gravity actuated pawl (not shown) is mounted upon the bracket 33 beneath the ratchet wheel 34 to prevent reverse rotation of the ratchet wheel. The forward sides of the ratchet wheel teeth are inclined, so that when the solenoid 30 is energized and the bell crank lever 35 moved clockwise (as viewed at Fig. 2), the pawl 31 slides over one tooth of the ratchet wheel and comes to rest in the next adjacent slot. When the solenoid 30 is then de-energized, the biasing spring 38 rotates the bell crank lever 35 in a counterclockwise direction to its stopped position shown, and the bell crank carries with it the drum shaft 24 and cams 25. In this manner the drum controller is rotated between discrete signal display positions.

It will be noted from Fig. 2 that the solenoid plunger 37 is conical. This shape facilitates lateral displacement of the plunger within the axial coil aperture due to arcuate movement of the bell crank arm to which the plunger is attached. Preferably the plunger 37 is also provided with braking means effective near the end of its pick-up stroke. Such braking means may suitably be magnetic, as shown in Patent 2,182,685, Weiler.

Referring now more particularly to Fig. 9, it will be observed that the mounting bracket 23 for the signal sequence controller 20 also has separately mounted thereon a switch block 26 formed of electric insulating material, which has fixed thereto a plurality of pairs of spaced apart fixed contacts 41, 42. The switch block 26 is mounted upon the bracket 23 below the cam shaft 24, and has removably fixed thereto a plurality of movable bridging switch members 27, the upper ends of which extend into camming engagement with the associated drum cams 25. Each bridging switch 27 is positioned on the block 26 by a removable key 43, and is biased into contact engaging position by means of a spring 44 on the key 43. The switch members 27 are held out of engagement with the upper fixed contacts 41 by means of the drum cams 25, and are permitted to come into engagement with the associated contacts 41 in any position of the drum shaft where a particular switch member 27 encounters a broken out cam segment. This bridging contact construction is fully described in Patent 2,236,298 issued to R. A. Reid on March 25, 1941.

It will now be evident from the foregoing description of the signal sequence controller 20 that the signal drum comprising the shaft 24 and the cams 25 may be removed from the supporting bracket 23 by merely removing from the bracket 23 the bearing bracket 32 and sliding the drum shaft 24 off the pin 33a, the bearing brackets 32 and 33 being preferably fixed to the mounting bracket 23 by means of threaded bolts. Such removal of the cam drum may be accomplished without in any way affecting the mounting of the cam contact block 26 or the cam switches 27 fixed thereto, and without effecting any disassembly of the drum shaft driving linkage mounted on the pin 33a. Upon such removal, the cams 25 may be slipped endwise off of the drum shaft 24 for convenient break out of desired cam segments, or more cams may be added to the shaft. In assembled position, the cams 25 are held against the ratchet wheel 34 by any convenient clamping means (not shown) such as a shaft collar provided with a set screw or the like. In addition to the foregoing simple drum shaft removal, the shaft driving linkage may also be readily removed as an assembled unit by merely removing the bracket 33 upon which the entire driving unit is mounted.

Referring now more particularly to the program timing unit 21, I have shown at Fig. 2 only a single such program timer, and at Figs. 4, 5, 6, 7 and 8, I have shown various detailed views of such a timer.

Each program timer 21 is formed as an integral unit mounted upon an L-shaped cast frame 45 having a rectangular channel-shaped upright portion and a hollow base portion. Referring more particularly to Fig. 6, each program timer frame 45 has a base portion formed to provide a front wall 45a, and is provided internally with a bracket 46 forming a back wall 46a in parallel spaced relation with the front wall 45a. In addition the base portion of the frame 45 has an apertured bottom wall formed by the bracket 46 and cut away at 46b to permit reception within the frame base of an upright arm 47 on the timer mounting bracket 22. As shown at Figs. 2 and 6, the program timer mounting brackets 22 are U-shaped and each provided with spaced apart upright arms 47 and 48. The program timer frame 45 is placed over the associated mounting bracket 22 so that the upright arms of the bracket 22 are adjacent the forward and rear walls 45a and 46a of the frame base, the arm 47 being intermediate the walls 45a and 46a and adjacent the inner side of the front wall 45a, and the arm 48 being adjacent the outer side of the rear frame wall 46a. A multiple prong electric plug 49 is mounted upon the upright bracket arm 48 with its prongs extending inwardly and parallel to the bight portion of the mounting bracket 22. A cooperating electric receptacle 50 is mounted upon the rear wall 46a of the base of the program timer frame 45 in position to be drawn into electrical contacting engagement with the plug 49 by horizontal rearward movement of the timer frame 45. For the purpose of attaching the timer frame 45 to the mounting bracket 22 and drawing the electric connectors 49 and 50 into contacting engagement, a connecting bolt 51 is rotatably mounted in the front wall 45a of the timer frame and provided externally with a knurled knob 52. The bolt 51 cooperates with a threaded aperture in the upright bracket arm 47. It will, of course, be appreciated by those skilled in the art that the upright arms 47, 48 of each U-shaped bracket 22 may, if desired, be separately formed and attached to the plate 4.

The upright channel-shaped portion of the program timer frame 45 is provided with a front panel 45c and side walls 45d having inturned rear end portions 45e forming a trackway. Journalled in the front panel 45c of the program timer frame 45 is a rotatable shaft 53. The shaft 53 extends through the panel 45c and has fixed thereto at its rear end and between the side walls 45d of the channel-shaped frame a driven gear 54. On the front side of the panel 45c, the timing shaft 53 has fixed thereto a timing drum (i. e., dial) 55. The timing dial 55 is preferably milled out of an integral piece of metal stock and is of a cylindrical formation which will be more fully described hereinafter. The cylindrical dial 55 is continuously driven through the driven gear 54 by means of a program timing motor 56 having an integrally connected gear box 57 and mounted upon the program timer frame 45 behind the front panel 45c. The motor 56 and its connected gear box 57 are fixedly mounted upon a motor mounting panel, or plate, 58 which is slidably mounted upon and clamped to the frame trackway formed by the inturned ends 45e of the frame side walls 45d. For this purpose the motor panel 58 is provided, on the side opposite the motor 56, with a pair of spaced apart elongated spacing lugs 58a. The spacing lugs 58a are spaced apart by just a sufficient distance to fit between the inturned ends 45e of the frame side walls 45d.

In parallel spaced relation with the motor panel 58 and spaced therefrom by the lugs 58a, there is fixed to the motor panel a clamping plate 59. The clamping plate 59 is loosely mounted upon a pair of mounting studs 60 (Figs. 2 and 6) at the lower end of the motor panel 58 and is biased by means of helical springs 61 on the studs 60 so that the clamping plate is held against the lugs 58a on the motor panel. A clamping bolt 62 is loosely mounted in the upper end of the motor panel 58 and arranged for threaded engagement with a cooperating threaded aperture in the clamping plate 59 to clamp the motor panel in position on the frame trackway. It will be evident that the motor panel 58 and connected clamping plate 59 embrace between them the trackway formed by the inturned ends 45e of the channel-shaped frame, and that when the clamping bolt 62 is drawn up, the motor panel is clamped in position upon this trackway. To ensure proper mesh of the gears 54 and 65, one side of the trackway 45e and one side of the motor panel 58 are provided with interfitting serrations as at 63 (Fig. 6). These serrations are so spaced that the gears are in proper meshing relation when the gears are as close together as possible with the serrations in interfitting relation.

Connected to the motor 56 through the gear box 57 is a driving shaft 64 which extends through the motor panel 58 and clamping plate 59 and carries at its extending end a driving gear 65. With the motor panel positioned on the frame as described, the driving gear 65 is positioned between the side walls 45d of the timer frame 45 and in driving relation with the driven gear 54. With the gears in operative driving relation, the motor panel 58 is clamped in place.

The foregoing operative position of the motor panel is indicated in terms of cycle time by means of an indicating bracket 66 fixed upon the motor panel and having a calibration visible from the front of the front frame panel 45c through a window 67 in the front panel. An indicating mark 68 upon the front panel adjacent the window 67 is operative in conjunction with the calibrations upon the indicating bracket 66 to show the cycle time for which the timer is adjusted. It will be understood that by changing the size of either the driving gear 65 or the driven gear 54, the cycle time of the program drum 55 may be changed and such change will be reflected in a change in operative position of the motor panel 58 and a consequent change in position of the indicating bracket 66. In preferred form, we contemplate that the driven gear 54 shall be changeable, and a variety of such gears of varying size are shown stacked upon one of the pantograph links 6 at Fig. 1.

The driving motor 56, 57 is preferably a self-starting synchronous motor of the type disclosed in U. S. Patent 1,430,867 issued to H. E. Warren. It comprises the tubular motor casing 56 attached to the larger speed reducing gear casing 57. The speed reducing gears drive the shaft 64 which is referred to herein as the driving shaft. The motor disclosed herein is a modification of the motor described in the above Warren patent in that the casing 56 is lengthened and two armatures are provided on the shaft therein. One of the armatures cooperates with a field 56a to produce a torque in one direction, and the other armature cooperates with the field 56b to produce an equal and opposite torque. If only the field 56a is energized, the motor will run to drive the program drum 55 in a counter-clockwise direction as viewed at Fig. 4, and this field 56a is thus known as the motor field. If both fields are simultaneously energized, equal and opposite torques are produced upon the armature shaft, and the motor comes to rest. Thus the field 56b is herein referred to as the braking field.

The program timing dial 55 is shown in detail at Figs. 4 and 6. The dial is of cylindrical or drum-like configuration and provided with a plurality of axial slots around its external periphery, within which are adapted to be selectively mounted any desired number of resilient hairpin shaped actuating keys 70, 71, 72, 73, 74 and 76. Each contact actuating key 70 to 76, inclusive, is provided with a radially extending contact actuating ear or projection 70a to 76a, respectively.

To receive the keys 70 to 76, inclusive, and hold them locked in place, the timing drum 55 is provided at the front with a reentrant annular recess 77 which is ridged on its outer peripheral surface to form an annular locking shoulder 77a. As most clearly shown at Fig. 6, each contact actuating key 70 to 76, inclusive, is a flat U-shaped strip of resilient material having a long side arm and a short side arm. The long side arm carries the contact actuating projection and when in operative position in the drum is substantially wholly embedded for substantially its entire length in one of the axial drum slots, the contact actuating projection extending beyond the surface of the drum. The short side arm of the key is provided at its end with a spring nib or detent 78 which springs into latching engagement with the locking shoulder 77a to retain the key in operative position embracing the recessed end of the dial drum. By thus positioning each actuating key in a long axial slot of a cylindrical timing drum and latching the keys in place, the keys are held firmly so that accurate timing is obtained.

For cooperation with the contact actuating keys 70 to 76, inclusive, in the timing drum 55, there is mounted upon the front panel 45c of the program timer frame 45 a contact block 80. The contact block 80 is formed of any suitable electric insulating material, and has pivotally mounted thereon a plurality of movable contact members 81, 82 and 83. These contact members are disposed substantially tangentially to the program timing drum 55 and positioned in the paths of the various actuating key projections 70a and 76a for actuation thereby. More specifically, the keys 70, 71, 73, 74 and 76 actuate the contact member 83, and the key 75 actuates the contact member 82, and the key 72 actuates the contact member 81. The contact block 80 is substantially rectangular and provided with a lower flat surface extending substantially perpendicular to the front frame panel 45c. A plurality of fixed contact members 84, 85 are fixed in the block 80 at its lower surface in spaced apart rows adjacent opposite ends of the contact arms 81, 82, 83. The movable contact arms 81, 82 and 83 are each pivotally mounted at one end upon a fixed pivot pin 86 which is fixedly mounted in the contact block 80 between spaced apart depending ears 80a and in substantially parallel spaced relation with the lower fixed contact surface of the block. The entire contact block 80 is fixed to the panel 45c by means of bolts 80b. At least one of the bolts 80b is adjustable in a slot 80c in the panel 45c, thereby to permit adjustment of the entire contact block 80 with respect to the dial 55.

The construction of the movable contact members 81, 82 and 83 is best shown at Figs. 4, 7 and 8. Each movable contact member comprises a U-shaped contact arm 87 elongated in the direction of its bight portion and having short parallel side portions 87a and 87b inturned at their upper end, as at 87 and 87d. Between the inturned end portions 87c and 87d, each contact arm 87 is formed to provide a pair of coplanar webs 87e and 87f respectively, the web 87f extending for the whole distance between the bight of the arm and the inturned stop 87d, and the web 87e terminating short of the bight portion of the contact arm to provide a lateral slot 87g. Preferably the contact arms 87 are formed of a molded plastic insulating material. Within each movable contact arm 87, parallel to its bight portion and between its short side portions is disposed an elongated bridging contact bar 88 of electric conducting material. The bridging contact bar 88 is slotted, or bifurcated, at its ends to fit slidably over the webs 87e and 87f, the bar 88 being inserted between the webs by sliding its one end into the slot 87g and upwardly on to the web 87e. The bridging contact bar 88 is biased away from the bight portion of the arm 87 and against the inturned ends 87c and 87d of the side arms by means of a compression spring 89 disposed substantially centrally of the contact member between the contact bar 88 and the bight portion of the contact arm 87. The spring 89 is held in position by seating at one end in a recess 90 in the contact arm 87 and at the other end over a projection 88a pressed out of the bridging contact bar 88.

Each movable contact arm 87, being pivotally mounted upon the contact block 80 as described, extends substantially parallel to the lower surface of the block in operative relation with the associated pair of fixed contacts 84 and 85. The free end of each movable contact arm 87 fits into a rectangularly apertured or slotted positioning plate 91 attached to the block 80, and is so positioned by the plate 91 that, in the normal dropped out position, each bridging contact bar 88 is held in engagement with the associated fixed contact 85 (nearest the pivot pin 86) and spaced from the associated fixed contact 84. Each movable contact arm 87 is further provided intermediate its ends with a depending camming projection 87h which extends into the path of the movement of certain of the actuating projections 70a to 76a, inclusive, on the actuating keys 70 to 76, inclusive. The operative relationship of the various keys and contact arms has been described hereinbefore.

The structure of the dial contact arms 81, 82 and 83 on the block 80 is the subject of a copending patent application Serial No. 212,383 filed on February 23, 1951 by Vincent W. Leonard, assigned to the same assignee as the instant application and subsequently issued as Patent 2,644,047 on June 30, 1953.

In the particular embodiment of the invention shown, the program timing dial 55 is provided with 100 slots, and the contact block 80 carries three movable contact members. Space is provided on the contact block for the provision of two additional contact members. The actuating projections 70a to 76a, inclusive, on most of the actuating keys are aligned with the contact member 83. A single key 75 is provided with an actuating projection aligned with the contact member 82, and a single key 72 is provided with an actuating projection aligned with the contact member 81.

The operation of our new and improved program timer per se will be fully understood by those skilled in the art from the foregoing detailed description of its structure, and the mode of operation of a controller utilizing a plurality of such timers is described in our foregoing copending patent application Serial No. 216,124.

While we have shown and described only a preferred embodiment of our invention by way of illustration, many modifications will occur to those skilled in the art and we, therefore, wish to have it understood that we intend in the appended claims to cover all such modifications as fall within the true spirit and scope of our invention.

What we claim as new and desire to secure by Letters Patent of the United States is:

1. In a cyclic program timer, a supporting frame, a pivot pin carried by said frame, a plurality of movable contact members pivotally mounted in side-by-side relation on said pin, a cylindrical dial member rotatably mounted upon said frame with its axis substantially parallel to said pin and with said contact members in substantially tangential relation to said dial member, said dial member being provided with an axially reentrant annular recess at one end and having a plurality of axial slots disposed around its outer periphery, a plurality of U-shaped keys having resilient arms embracing said recessed end of said dial member in clamping relation therewith and having their outer arms slidably positioned in said slots, said outer arms being provided with contact actuating projections arranged selectively to engage said contact members, and means for continuously rotating said dial member.

2. In a cyclic program timer, a supporting panel, a contact block mounted upon said panel and including a pivot pin disposed substantially perpendicular to said panel, a plurality of movable contact members pivotally mounted upon said pin, a cylindrical dial member rotatably mounted upon said panel with its axis in parallel spaced relation with said pivot pin, said movable contact members being substantially tangentially disposed with respect to said dial member, said dial member being provided with a plurality of axial slots disposed around its outer peripheral surface and having at one end a reentrant annular recess with an annular surface thereof provided with an annular shoulder, a plurality of U-shaped actuating keys slidably mounted in said slots and having resilient arms disposed to embrace the recessed end of said dial member, one arm of each said key lying in one of said axial slots and having a contact actuating projection thereon arranged to engage a selected one of said movable contact members and the other arm of each said key being located in said recess of said dial member and having a latching surface which resiliently engages said annular shoulder thereof when the contact actuating projection of its said one arm is arranged to engage said selected one of said movable contact members, and continuously operable driving means mounted upon said frame and connected continuously to rotate said dial member.

3. In a cyclic program timer, a supporting frame, a pivot pin carried by said frame, a plurality of movable contact members pivotally mounted in side-by-side relation on said pin, a cylindrical dial member rotatably mounted upon said frame with its axis substantially parallel to said pin and with said contact members in substantially tangential relation to said dial member, said dial member being provided with a plurality of axial slots disposed around its outer periphery and having an axially reentrant annular recess at one end, the outer wall of said recess having formed thereon an annular latching shoulder, a plurality of U-shaped keys each having a long arm carrying an actuating projection and a resilient short arm having at the end thereof a latching detent, said keys being radially disposed about said cylindrical dial member and embracing the recessed end thereof, each said key having its long outer arm slidably positioned substantially wholly within one of said axial slots with its actuating projection extending radially beyond said slot and having its short inner arm extending into resilient engagement wth said recess with said latching detent in locking relation with said annular latching shoulder.

4. In a cycle timer, a supporting frame including a serrated trackway, a shaft rotatably mounted in said frame and carrying a driven gear, a motor support slidably mounted on said trackway and having a serrated trackway engaging surface, a driving motor mounted on said support, a shaft connected to said motor and carrying a driving gear adapted to engage said driven gear in meshing relation when said motor support is on said trackway, and means for clamping said motor support to said trackway with said serrated surface and serrated trackway in inter-fitting relation thereby to maintain said gears in predetermined meshing relation.

5. In a cycle timer, a channel-shaped supporting frame incluing a front panel and side walls having inturned rear edges forming a trackway, a timing shaft rotatably mounted in said front panel and carrying a driven gear disposed between said side walls, a motor panel slidably mounted upon said trackway, an electric driving motor mounted on one side of said motor panel, a driving shaft connected to said motor and extending through said motor panel, a driving gear mounted on said driving shaft on the other side of said motor panel and disposed between said side walls, means for clamping said motor panel in position on said trackway with said gears in driving relation, and indicating means mounted on said motor panel and visible on the face of said front panel for indicating the cycle time of said driven shaft for various positions of said motor panel.

6. In a cycle timer, a channel-shaped supporting frame including a front panel having an indicating mark thereon and side walls having inturned rear edges forming a trackway, a timing shaft mounted in and passing through said front panel, a timing dial mounted on said shaft in front of said front panel, a driven gear mounted on said shaft behind said front panel and between said side walls, a motor panel having a pair of spacing lugs adjacent opposite edges of one face thereof spaced to fit between said inturned edges of said side walls, a clamping plate loosely fixed to said motor panel at one end and overlying said lugs, said motor panel being slidably mounted on said trackway with said motor panel and clamping plate in clamping relation on opposite sides of said inturned edges of said side walls, clamping means connected between said motor panel and said clamping plate at the other end thereof to clamp said panel to said trackway in a desired position, a driving motor mounted upon the opposite face of said motor panel, a driving shaft connected at one end of said motor and extending through said motor panel, a driving gear on said driving shaft disposed between said side walls for cooperation with said driven gear in driving relation, and indicating means mounted upon said motor panel and visible in cooperative relation with said indicatng mark on said front panel for indicating the cycle time of said dial as determined by the operative position of said motor panel.

References Cited in the file of this patent

UNITED STATES PATENTS

| | | |
|---|---|---|
| 1,882,495 | Hipp | Oct. 11, 1932 |
| 2,026,648 | Olafson | Jan. 7, 1936 |
| 2,045,251 | Raber | June 3, 1936 |
| 2,165,444 | Bissel | July 11, 1939 |
| 2,633,913 | Morrow et al. | Apr. 7, 1953 |